United States Patent [19]

Lewis

[11] 4,393,443

[45] Jul. 12, 1983

[54] MEMORY MAPPING SYSTEM

[75] Inventor: John Lewis, Tigard, Oreg.

[73] Assignee: Tektronix, Inc., Beaverton, Oreg.

[21] Appl. No.: 151,541

[22] Filed: May 20, 1980

[51] Int. Cl.[3] .................... G06F 9/36

[52] U.S. Cl. .................... 364/200

[58] Field of Search ... 364/200 MS File, 900 MS File

[56] References Cited

U.S. PATENT DOCUMENTS

| | | | |
|---|---|---|---|
| 3,761,881 | 9/1973 | Anderson | 364/200 |
| 3,764,996 | 10/1973 | Ross | 364/200 |
| 3,854,126 | 12/1974 | Gray et al. | 364/200 |
| 3,949,378 | 4/1976 | Crabb | 364/200 |
| 4,163,280 | 7/1979 | Mori | 364/200 |
| 4,176,400 | 11/1979 | Heckel | 364/900 |
| 4,202,040 | 5/1980 | Whitworth | 364/900 |

OTHER PUBLICATIONS

Peuto, B. L., *Architecture of a New Microprocessor*, In Computer, vol. 12, No. 2, Feb. 1979.

Bennett, S., *ROM Decoder for Memory Mapped μP Systems*, In Electronic Engineering, vol. 51, No. 622, May 1979.

*Primary Examiner*—Joseph F. Ruggiero
*Assistant Examiner*—Michael R. Fleming
*Attorney, Agent, or Firm*—John Smith-Hill

[57] ABSTRACT

A circuit for enhancing the performance of a random-access-memory-based memory expansion system is disclosed. Memory capacity and a control register are added to the traditional memory mapping circuit. The increased memory is utilized to store several maps simultaneously and the circuit output is then switched from one stored map to another according to data present at the control register outputs. Thus, by pre-loading the circuit with all the memory maps required by a particular program, delay caused by map changes is reduced to the time required to move data to the control register outputs.

10 Claims, 4 Drawing Figures

MAIN MEMORY
50
(N+x) BITS
ADDRESS BUS B
N BITS
LOAD DATA
15
RAM MAP
150
n BITS
x BITS
(n+x) BITS
ADDRESS BUS A 200
(m+n) BITS
m BITS
PROCESSOR
MAP CONTROL REGISTER
10
ADDRESS BUS A (n+x) BITS

MAIN MEMORY
50
(N+x) BITS
ADDRESS BUS B
N BITS
LOAD DATA
OUTPUT ENABLE
RAM MAP #1
DATA OUT
20
LOAD DATA
OUTPUT ENABLE
RAM MAP #2
DATA OUT
30
LOAD DATA
OUTPUT ENABLE
RAM MAP #M
DATA OUT
40
x BITS
n BITS
(n+x) BITS
ADDRESS BUS A
LOAD DATA
15
MAP CONTROL REGISTER
10
PROCESSOR

MAIN MEMORY
50
(N+x) BITS
ADDRESS BUS B
N BITS
100
10
LOAD DATA
15
MAP CONTROL REGISTER
CHANNEL SELECT
MULTIPLEXER
20
30
40
LOAD DATA
RAM MAP #1
RAM MAP #2
RAM MAP #M
N BITS
x BITS
n BITS
PROCESSOR
ADDRESS BUS A (n+x) BITS

MEMORY MAPPING SYSTEM

BACKGROUND OF THE INVENTION

The present invention relates to memory expansion systems for microprocessors and more particularly to a high-speed memory mapping system.

At one time or another one may desire to expand the storage capability of a particular microcomputer. However, there are two basic limits to storage or memory space: logical and physical. Logically a microcomputer is limited to a certain amount of addressable memory by its instruction set. Any linked set of code is usually confined to a certain logical space, depending upon the address size supported by the instruction set. The maximum number of bits allowed in a typical microcomputer is 16 which yields a total of 64K (K=1024) addresses. The physical limits of memory space are determined by the number of wires carrying an address to the memory.

If memory expansion beyond the logical address space is desired, some transformation or translation must be applied to the logical address to convert it to a physical address. This translation consists of combining the logical address, or a portion of it, with a base address which is obtained in a particular manner. The method of selecting the base address and combining it with the logical address has been used to classify memory expansion techniques. The three basic methods of translating a logical address into a physical address are: memory mapping, bank switching, and the use of base registers.

Memory mapping involves dividing the logical address into essentially two parts—a descriptor, which is a set of the most significant bits, and a displacement, which is the remaining bits of the address. A function is applied to the descriptor, and the result of this function is a physical address which may be called a page address. The displacement is added to the page to give a physical address. In most cases, the page address is concatenated with the displacement.

The transformation or function applied to the descriptor has been normally provided by a binary-to-N line decoder or more recently a read-only-memory (ROM). The ROM is utilized to translate a logical address into a physical address by decoding the address bus. The ROM can infer information about which address is being selected by processing a portion of the address bus through its memory. Such a ROM-based memory mapping system is described in "ROM Decoder for Memory Mapped μP Systems" by S. Bennett, *Electronic Engineering.* Vol. 51, No. 622, May 1979. However, if one desires to change the memory map in this system the ROM has to be reprogrammed or physically replaced. Therefore considerable time is wasted in changing memory maps.

SUMMARY OF THE INVENTION

According to the present invention, a random-access memory (RAM)-based memory mapping circuit is provided for expanding the memory addressing capability of a computer. The invention accomplishes this by adding memory capacity and a control register to a conventional mapping circuit. The increased storage capacity is used to store several memory maps simultaneously. The circuit output is switched from one stored map to another by changing the data present at the outputs of the control register. By pre-loading the mapping circuit with the maps required by a particular program, the delay for each map change during program execution is reduced to the time required to load data into the control register.

It is, therefore, a primary object of the present invention to provide a RAM-based memory mapping circuit.

It is another object of the present invention to provide a means of decreasing the time required to change or replace memory maps.

The foregoing and numerous other objects, advantages and inherent functions of the present invention will become apparent as the same is more fully understood from the following description. It should be understood, however, that the several embodiments described are not intended to be exhaustive nor limiting of the invention and are presented as examples only.

DETAILED DESCRIPTION OF THE PREFERRED EMBODIMENTS

Figures 1, 2:
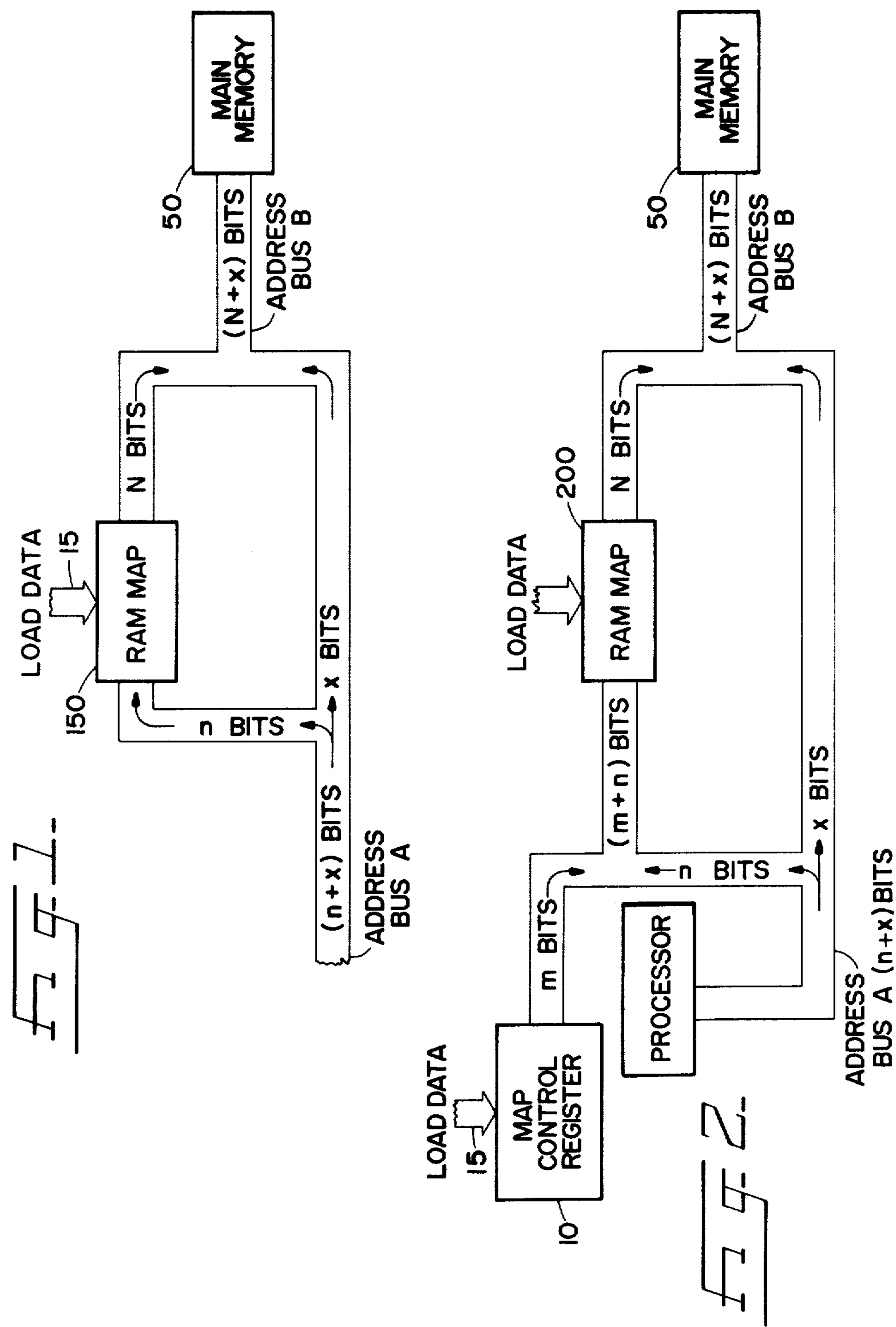
FIG. 1 is a block diagram of a first memory mapping system embodying the present invention.
FIG. 2 is a block diagram of an embodiment of the present invention which utilizes a single RAM.

FIG. 1 shows a RAM 150 which contains a memory map. Main memory 50 may be any combination of ROM's or RAM's. Address bus A has its n more significant lines connected to the address lines of RAM 150 and the x remaining address lines connected to main memory 50 as part of address bus B. The output of RAM 150 is also fed to main memory 50 as the N more significant bits of address bus B. In operation, a specific code on the n address lines corresponds to a unique address location within RAM 150. The N-bit data word at this location is placed on the N output lines when this word is addressed. Thus, a code on the upper n address lines of bus A is transformed to a new code on the upper N address lines of bus B. As mentioned above, the lower x lines of address bus A are directly connected to the corresponding x lines of address bus B.

The result of the transformation by RAM 150 is that a device (memory, input/output, etc.) at a particular address on address bus B appears (to devices on address bus A) to be located at the address on bus A which was transformed. Since the number of address lines connecting address bus A to RAM 150 is n, $2^n$ different binary words may be placed on these lines resulting in $2^n$ potentially different words being placed by RAM 150 on the upper N bits of address bus B. Thus, $2^n$ blocks of address bus B addresses (each comprising $2^x$ contiguous address, where x is the number of less significant bits of the A and B address buses) may be "mapped" into address bus A address space. To change the block of addresses mapped into a particular address space of address bus A, the binary word stored at that particular address space must be replaced. Extensive map changes result in considerable time spent loading RAM 150 with new data.

The embodiment of the present invention shown in FIG. 2 overcomes the above-described limitation of the FIG. 1 system. By comparing FIG. 2 to FIG. 1, it can be seen that RAM 150 has been replaced by RAM 200. RAM 200 has increased storage and consequently additional address lines. RAM 200 has (m+n) address lines. The additional m address lines are connected to the outputs of map control register 10.

Map control register 10 comprises a data register which is by definition any device capable of maintaining known data on its output lines for a desired length of time. A data register is also capable of being loaded with new data for presentation at its outputs when desired. Examples of specific devices which satisfy the above definition are: RAM's, shift registers, addressable latches and first-in, first-out (FIFO) registers.

For each unique binary code on the m input lines of the (m+n) address lines of RAM 200 an independent set, or map, of $2^n$ address blocks may be available in RAM 200. Therefore, changing from one memory map to another may be accomplished by changing the output of map control register 10. Map control register 10 is essentially a storage latch for the map selection and its output may be changed by loading new data via LOAD DATA bus 15. In the embodiment of FIG. 2, $2^n$ possible maps may be selected.

Figure 3:
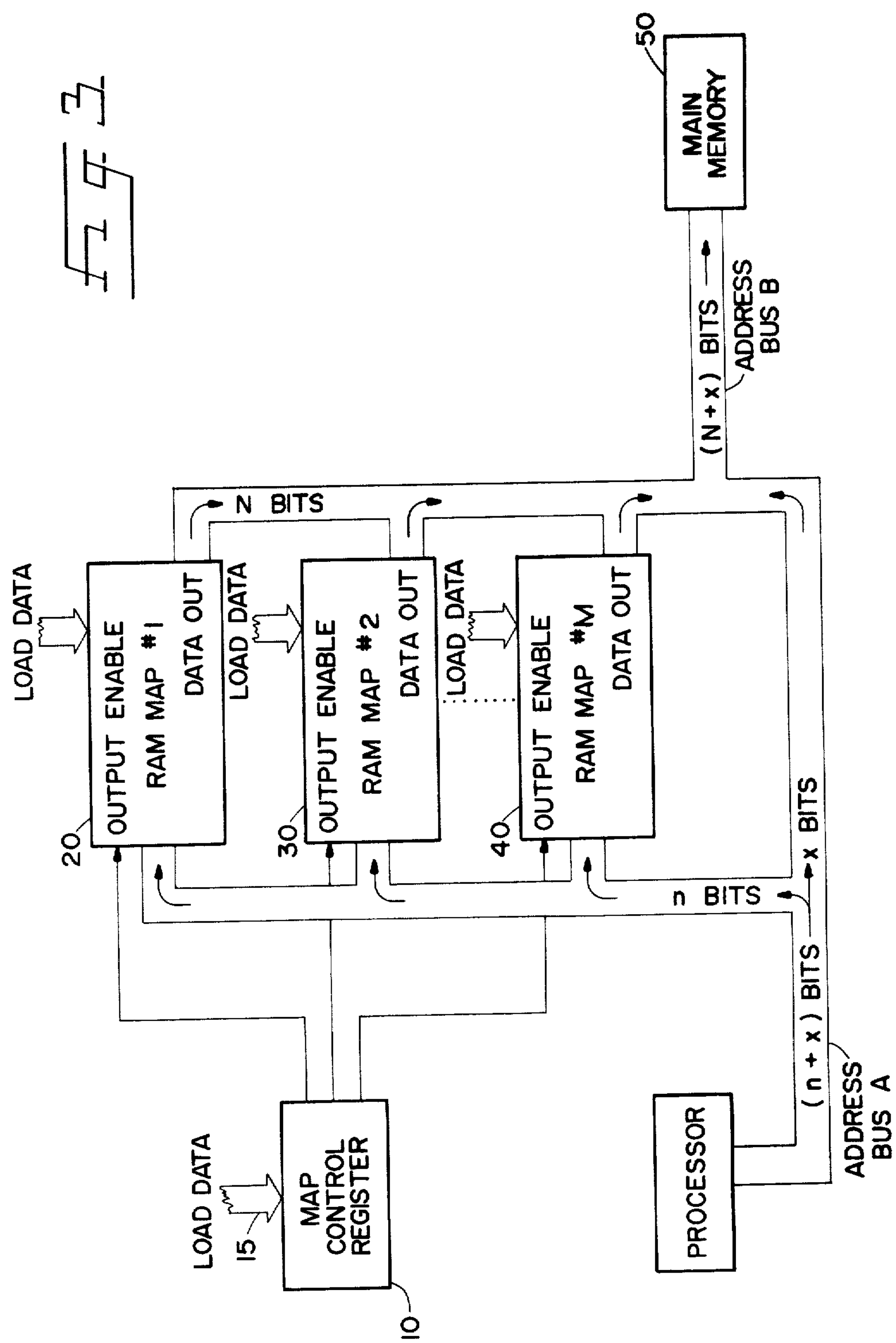
FIG. 3 is a block diagram of an embodiment of the present invention which utilizes multiple RAM's.

FIG. 3 depicts an alternative embodiment of the present invention wherein a plurality of RAM's are utilized each one containing a different memory map. Address bus A comprises (n+x) lines, n lines of which address each one of the RAM's. The remaining x lines of address bus A form part of address bus B. The other part of address bus B is the N data outputs of each RAM. Thus, address bus B comprises (x+N) lines. N is typically greater than n. Map control register 10 has m data output lines each one of which is connected to the output enable input of one of the RAM's. Data loaded into map control register 10 via data bus 15 selects one RAM enable input and, therefore, the map contained in that RAM is available to address bus B.

Figure 4:
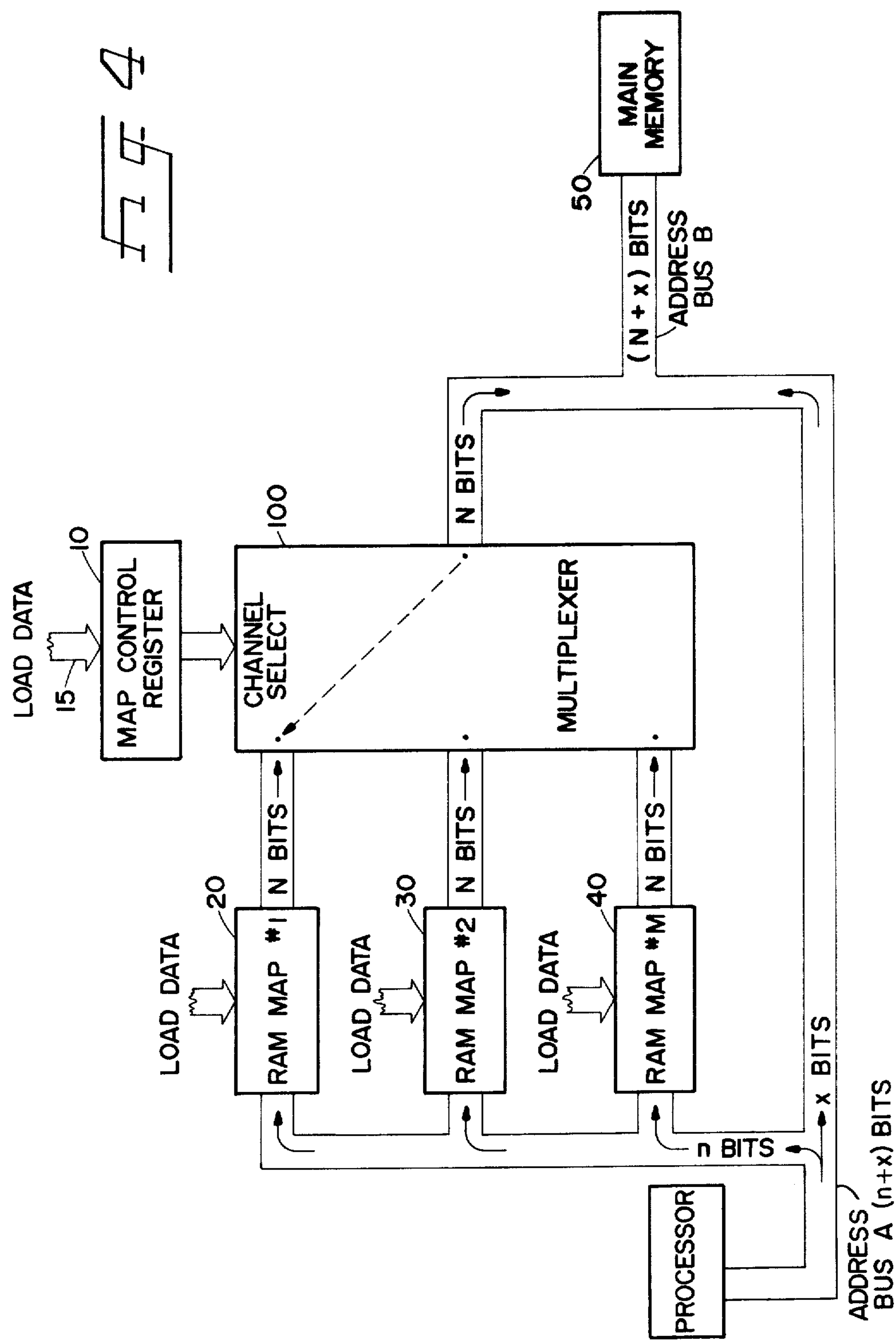
FIG. 4 is a block diagram of an embodiment of the present invention which utilizes multiple RAM's and a multiplexer.

FIG. 4 is illustrative of another embodiment of the present invention. In this embodiment, the output enable lines of the RAM's are not utilized and the outputs of the RAM's are selected by a multiplexer. Address bus A comprises (n+x) lines, n lines of which address each one of the RAM's over an n-line address bus. The x lines of address bus A form part of address bus B. The other part of address bus B comprises the multiplexed N data outputs of the RAM's.

The N output lines of each RAM are connected to an input channel of data multiplexer 100. Channel selection is made by the output of map control register 10. Thus, the map stored in the RAM connected to the selected channel is made available to address bus B via the output of multiplexer 100. Multiplexer 100 may be any commercially available data multiplexer.

From the foregoing it will be seen that the applicant has provided a new and novel memory mapping circuit. It also will be seen that the foregoing specification has not been burdened by the inclusion of large amounts of detail and specific information relative to such matters as circuitry, timing, and the like. This information is felt to be within the skill of the art. Publications which relate to the above matters and which are herein incorporated by reference, are: *Microcomputer Design*, C. A. Ogdin, copyright 1978, by Prentice-Hall, Inc., and *Introduction to Microcomputer System Design*, H. Garland, copyright 1979 by McGraw-Hill, Inc.

It should be noted that the various embodiments of the invention which are shown and described herein are intended to be illustrative and not restrictive of the invention. Therefore, the appended claims are intended to cover all modifications which fall within the scope of the foregoing specification.

I claim as my invention:

1. A memory mapping system comprising:

a first address bus portion having a first set of n lines and a second set of x lines, for receiving logical address information;

a second address bus portion for providing physical address information to main memory means of a computer, said second address bus portion having a first set of N lines, where N is greater than n, and a second set of x lines connected to the second set of x lines of the first address bus portion;

random access memory means having n input lines connected to the first set of n lines of the first address bus portion and N output lines connected to the first set of N lines of the second address bus portion, said random access memory means having a plurality of memory regions which are individually selectable for connection to said n input lines and to said N output lines, and each memory region being operative, when selected, to transform information provided on said n input into information on said N output lines; and a control register having input means for receiving data and output means at which said data is made available and operatively connected to the random access memory means for utilizing said data to select which one of the plurality of memory regions is connected to said n input lines and to said N output lines.

2. A memory mapping system according to claim 1, wherein said random access memory means comprise a single random access memory (RAM) and each memory region constitutes an independent set of addressable memory locations in the RAM, said RAM having m additional input lines connected to the output means of the control register, whereby the control register is able to select each of said independent sets of memory locations in dependence upon data received by way of said input means.

3. A memory mapping system according to claim 1, wherein said random access memory means comprise a plurality of random access memories (RAMs) each having n input lines connected to the first set of n lines of the first address bus portion and N output lines connected to the first set of N lines of the second address bus portion, and each RAM also has an output enable terminal, and said control register has a plurality of output terminals connected to the output enable terminals of the RAMs respectively, whereby the control register is able to enable the output lines of each RAM in dependence upon data received by way of said input means.

4. A memory mapping system according to claim 1, wherein said random access memory means comprise a plurality of random access memories (RAMs) each having n input lines connected to the first set of n lines of the first address bus portion and N output lines, and multiplexing means connected to the N output lines of the RAMs, said multiplexing means being operative to transfer information provided on the N output lines of a selected RAM to the N output lines of said random access memory means, and having control input means connected to the output means of the control register for effecting selection of a RAM in dependence upon data received by the control register by way of said input means thereof.

5. A memory mapping system according to claim 1, wherein said control register comprises a data register capable of being loaded by way of said input means with data for presentation at said output means and for maintaining said data at said output means for a desired length of time.

6. A memory mapping system according to claim 5, wherein said data register is a first in, first out register.

7. A memory mapping system according claim 5, wherein said data register is a random access memory.

8. A memory mapping system according to claim 5, wherein said data register is a shift register.

9. A computer comprising a memory mapping system according to claim 1, 2, 3, or 4, a processor unit having (n+x) address lines connected to said first address bus portion for applying logical address information to the memory mapping system, and main memory means having (N+x) address lines connected to said second address bus portion for receiving physical address information from the memory mapping system.

10. A memory mapping system comprising:

a first address bus portion having a first set of n lines and a second set of x lines, for receiving logical address information;

a second address bus portion for providing physical address information to main memory means of a computer, said second address bus portion having a first set of N lines, where N is greater than n, and a second set of x lines connected to the second set of x lines of the first address bus portion; and random access memory means having n input lines connected to the first set of n lines of the first address bus portion and N output lines connected to the first set of N lines of the second address bus portion, said random access memory means being operative to transform information provided on said n input lines into information on said N output lines, and the random access memory means also having a load data input for loading data into the random access memory means, whereby the information that is provided on said N output lines in response to given information provided on said n input lines may be altered.

* * * * *